Oct. 21, 1947.  F. RIEBER  2,429,427
FREQUENCY CONTROLLED FREQUENCY METER
Filed May 19, 1944
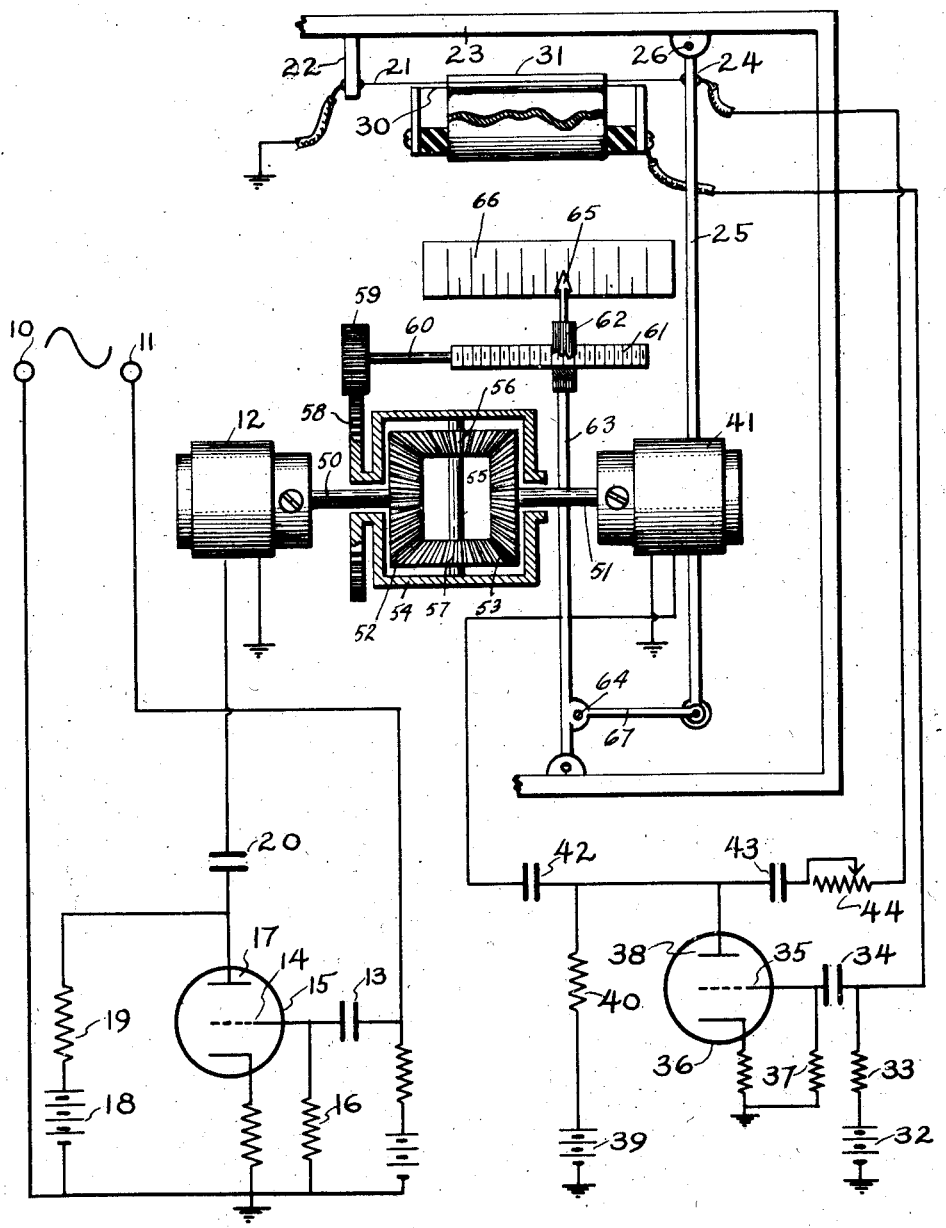
INVENTOR.
FRANK RIEBER
BY Patented Oct. 21, 1947

2,429,427

UNITED STATES PATENT OFFICE 2,429,427

FREQUENCY CONTROLLED FREQUENCY METER

Frank Rieber, New York, N. Y., assignor to Interval Instruments, Inc., New York, N. Y., a corporation of New York Application May 19, 1944, Serial No. 536,410

5 Claims. (Cl. 250—39)

This invention relates to a device for measuring accurately and continuously the frequency of an alternating current.

It is an object of this invention to provide a device of the character described, which will automatically measure the frequency with a high degree of accuracy.

It is a further object to produce a local oscillatory current having precisely the frequency of an incoming wave, but completely free from it as to phase relationship.

It is a further object to provide a device of the character described, which may be made to produce a local oscillatory current which may have a frequency bearing any desired ratio of frequency to an incoming current.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

The figure of the drawing shows the device schematically.

In the drawing the numerals 10 and 11 represent the incoming leads on which are imposed the current whose frequency is to be measured. This current is connected by a suitable amplifying system to drive a synchronous motor 12.

As shown, the lead 10 is grounded and the lead 11 is connected through a condenser 13 to the grid 14 of a vacuum tube 15, the grid bias being determined by a leak 16. The plate 17 of this tube is energized by a battery 18 acting through a resistance 19, and it is shown connected to the synchronous motor 12 through a condenser 20.

The standard with which the frequency is to be compared comprises a standard frequency circuit having a wire 21 held at one end, preferably resiliently by a quartz spring 22 attached to a base 23, and at the other end connected to a midpoint 24 of a lever 25 pivoted at 26 to the base 23. Parallel to the wire 21 is an electrode 30, and a magnet 31 exerts a field of force transverse to both these wires.

A potential is maintained upon the electrode 30 by a battery 32 acting through a resistance 33, and the electrode is connected through a condenser 34 to the grid 35 of a vacuum tube 36. The grid bias may be obtained by a grid leak 37.

The plate 38 of the tube 36 is energized by a battery 39 acting through a resistance 40, and the plate is shown as connected to a synchronous motor 41 through a condenser 42. The tube is maintained in oscillation by current passing through the wire 21 from the plate circuit, through a condenser 43 and a feed-back control resistance 44. The form of oscillator here shown is described and claimed in my copending application for oscillating systems, filed January 29, 1944, and bearing Serial No. 520,197. But within the broad scope of this invention, any source of frequency may be employed.

The motors 12 and 41 are thus driven respectively in opposite directions at the speeds of the incoming frequency and of the frequency generated in the oscillating system. These motors are connected to a differential of any suitable construction. As illustrated, the shafts 50 and 51 of these motors are placed in alignment and each carries a bevel gear 52—53 in a housing 54 which is journaled for rotation on the shafts 50 and 51. A cross shaft 55 journaled in housing 54 carries bevel gears 56 and 57, each meshing with both of gears 52—53 in the usual manner. Attached to the housing 54 is a gear 58 meshing with a pinion 59 on a shaft 60, screw-threaded at one end at 61 to engage a partial nut 62 pivotally mounted on a lever 63 pivoted at 64, and carrying at its other end an indicator 65 moving over a dial 66.

The lever 63 is connected by a pivoted link 67 with the free end of lever 25, and the ratio of leverage is such that the total movement of the nut 62 on screw 61 will alter the tension on wire 21, as carried by the quartz spring, just enough to alter the frequency of the oscillatory system throughout the entire range through which the instrument is adjusted to respond. Obviously the fixed upper and lower limits may be altered by adjustment of any of the parts to alter the initial tension on wire 21.

With the above construction it will be clear that for every position on the scale, the oscillator produces a fixed frequency. If the incoming current is of the same frequency and both motors be connected, they will exactly neutralize each other on the differential and the reading will remain unchanged, and thus the reading on the scale will exactly indicate the frequency.

If, on the other hand, the frequencies are not alike, the differential gear will move the lever system to change the oscillator frequency until it does correspond, and this change will move the indicator to the new and correct position.

Where the motors 12 and 41 have the same speed for the same frequency, the controlled frequency will be equal to the standard frequency, but where different speed motors are employed, a fixed ratio will be maintained between the standard and the generated frequency.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device for measuring frequency, comprising a motor connected to be driven synchronously by the current whose frequency is to be measured, an oscillating circuit having a range of frequencies including that to be measured, a synchronous motor driven by said oscillating circuit, differential means driven by the difference in speed between said motors for varying the frequency of said oscillating circuit, an indicator connected to said frequency regulating device to indicate the regulated frequency of the oscillating circuit.

2. A device according to claim 4, in which said oscillating circuit comprises a wire vibrating in a magnetic field in response to said osciliating current, and connections constructed and arranged to determine the frequency of oscillation of said circuit by the vibrations of said wire, and said frequency varying means comprising means operated by the difference in speed between said motors for varying the tension upon said wire to increase the tension thereon whenever the speed of said second motor is lower than the speed of first motor, and the indicator is operated by said tension varying means.

3. A device for measuring frequency, comprising a motor, connections to drive said motor synchronously with the current whose frequency is to be determined, a second synchronous motor connected differentially to said first motor, an oscillating circuit including a stretched wire and an electrode parallel to said wire, a magnet having its poles disposed to create a field of force transverse to the plane of said wire and said electrode, said oscillating circuit being connected to pass an oscillating current through said wire and having a grid connected to said electrode whereby the frequency of oscillation is determined by the frequency of vibration of said wire, means for driving said second motor from said oscillating current, means operated by the differential motion of said motors for varying the tension upon said wire to increase the tension thereon whenever the speed of the second mentioned motor is less than the speed of the first mentioned motor, and means connected to said tension-varying-means for indicating the frequency.

4. A device for measuring the frequency of an alternating current, comprising a pair of synchronous motors connected by differential mechanism to a lever system, an oscillating circuit, connections for driving the first mentioned motor by the current whose frequency is to be measured, and for driving said second mentioned motor by oscillating current from said oscillating circuit, said oscillating circuit comprising a stretched wire, and an oscillating tube having its grid connected to be responsive to the vibrations of said wire and connected to maintain said wire in vibration, said lever mechanism being connected to one end of said wire to vary the tension thereon in a direction to bring the motors to the same speed, and means connected to said lever mechanism for indicating the frequency of said oscillating current.

5. A device for indicating the frequency of an alternating current including a synchronous motor driven by the current to be measured, a controllable source of alternating current, a standardizing device having an adjusting mechanism for controlling the frequency of said controllable source, a second synchronous motor driven by said controllable source, differential connections between said motors connected to said adjusting mechanism for setting said standardizing device, said standardizing device having means to read the frequency to which it is set.

FRANK RIEBER.

REFERENCES CITED

The following references are of record in the file of this patent:

UNITED STATES PATENTS

| Number | Name | Date |
|---|---|---|
| 2,265,011 | Siegel | Dec. 2, 1941 |
| 2,094,141 | Zingg | Sept. 28, 1937 |

FOREIGN PATENTS

| Number | Country | Date |
|---|---|---|
| 795,156 | France | Dec. 2, 1941 |
| 548,333 | Germany | Apr. 15, 1932 |

Certificate of Correction

Patent No. 2,429,427.   October 21, 1947.

FRANK RIEBER

It is hereby certified that error appears in the printed specification of the above numbered patent requiring correction as follows:

Column 3, line 34, for the claim reference numeral "4" read *1*;

and that the said Letters Patent should be read with this correction therein that the same may conform to the record of the case in the Patent Office.

Signed and sealed this 15th day of February, A. D. 1949.

[SEAL]

THOMAS F. MURPHY,
*Assistant Commissioner of Patents.*